Dec. 13, 1932.   L. RIBAR   1,890,864
WINDSHIELD ATTACHMENT
Filed Jan. 22, 1931
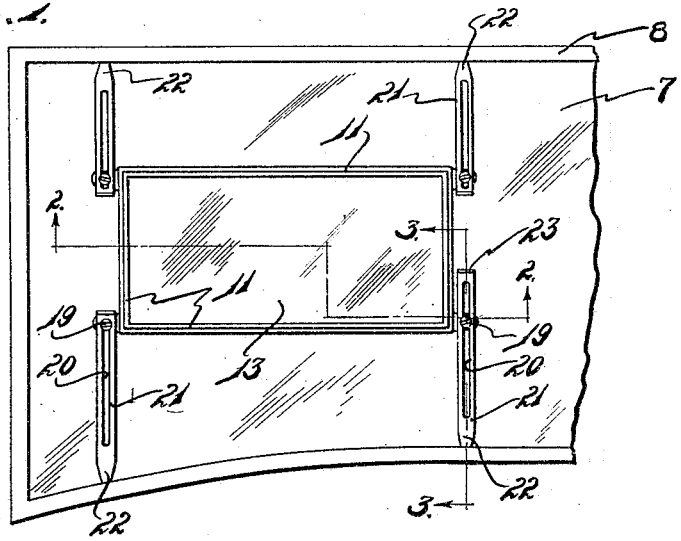
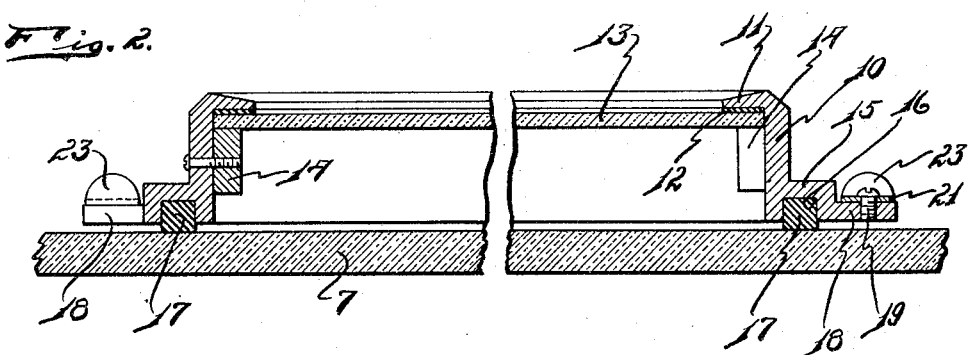
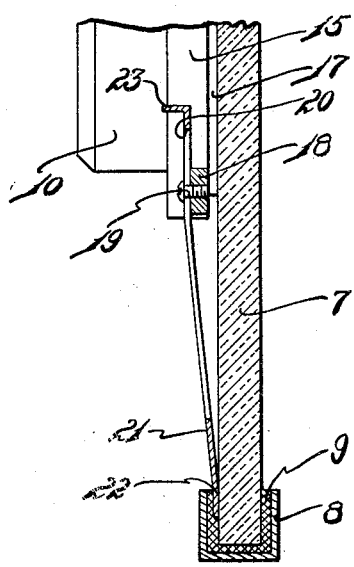
INVENTOR.
Louis Ribar
BY
ATTORNEY.

Patented Dec. 13, 1932

1,890,864

UNITED STATES PATENT OFFICE

LOUIS RIBAR, OF PLYMOUTH, MICHIGAN

WINDSHIELD ATTACHMENT

Application filed January 22, 1931. Serial No. 510,420.

My invention relates to a new and useful improvement in a windshield attachment adapted for mounting in position on a windshield in cold weather so as to prevent an accumulation of ice, sleet, snow, a moisture film, and other similar foreign material which would have a tendency to obstruct the vision of the operator of the vehicle.

It is an object of the present invention to provide a device of this class which will be simple in structure, economical of manufacture, and highly efficient in use.

Another object of the invention is the provision of a device of this class which may be easily and quickly attached on and detached from the windshield on which used.

Another object of the invention is the provision in a device of this class of means for effectively sealing on the windshield an enclosed space so as to provide over a definite area an air insulation.

Other objects will appear hereinafter.

The invention consists in the combination and arrangement of parts hereinafter described and claimed.

The invention will be best understood by a reference to the accompanying drawing which forms a part of this specification, and in which, Fig. 1 is a front elevational view of the invention showing it applied.

Fig. 2 is a view taken on line 2—2 of Fig. 1.

Fig. 3 is a sectional view taken on line 3—3 of Fig. 1.

The invention is adapted for use with a vehicle windshield having the glass portion 7 supported in a frame 8 in which is the sound deadening layer of felt 9. The invention comprises a frame 10 which, in the drawing, I have illustrated as rectangular in form. Extending inwardly at the outer edge of the frame 10 is a flange 11 engaging the inner surface of which is a layer 12 of felt or other sound deadening material against which the transparent closure or pane of glass 13 is held in engagement by means of the blocks 14 mounted on the inner surface of the frame 10. Extending outwardly from the opposite end of the frame 10 is the flange 15 having a channel 16 formed in one of its faces for reception of the sealing strip 17 which is formed from rubber or other similar material and which is adapted to engage the inner surface of the windshield glass 7 so as to securely seal a defined area thereof to retain within the frame 10 the air enclosed therein and to thus provide over the defined area of windshield glass 7 and air insulation.

Projecting outwardly from the flange 15 at the corners thereof, at opposite sides of the frame, are lugs 18, threaded into each of which is a screw 19 projected through the elongated longitudinally extended slot 20 formed in the locking fingers or plates 21, each of which has a tapered end 22. The opposite end is angularly turned to provide a finger grip 23. As clearly shown in Fig. 1, at the opposite ends of the frame, a pair of these locking fingers 21 are in alignment with each other.

To secure the device in position on the windshield, the locking fingers at opposite sides are pressed between the windshield glass 7 and the layer 9 of felt so as to enter the frame 8. When the locking fingers are all engaged in this manner and the frame 10 located in the desired position, the screws 19 may be tightened to prevent slidable movement of the locking fingers 21 on the lugs. In this way the frame may be easily and quickly and securely attached in position on the windshield.

When the device is mounted on the windshield in this manner, the accumulation of snow, moisture film, sleet, etc. on the windshield is entirely prevented, and a clear space on the windshield is always present through which the operator of the vehicle may look.

While I have illustrated and described the preferred form of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. A device of the class described, comprising: a frame; a transparent closure mounted in said frame at one side thereof; a flange projecting outwardly from said frame at the opposite side and provided in one of its faces with a groove; a strip of yieldable material engaging in said groove and adapted for being positioned in engagement with the glass of a windshield; a pair of lugs projecting outwardly from said flange at opposite edges; and a locking finger slidably mounted on each of said lugs and engageable with a windshield frame for retaining said first mentioned frame in position thereon.

2. A device of the class described, comprising: a frame; a transparent closure mounted in said frame at one side thereof; a flange projecting outwardly from said frame at the opposite side and provided in one of its faces with a groove; a strip of yieldable material engaging in said groove and adapted for being positioned in engagement with the glass of a windshield; a pair of lugs projecting outwardly from said flange at opposite edges; a locking finger slidably mounted on each of said lugs and engageable with a windshield frame for retaining said first mentioned frame in position thereon; and means for locking each of said fingers against slidable movement on its lug.

3. A device of the class described, comprising: a frame; a transparent closure mounted in said frame at one side thereof; a strip of yieldable material projecting outwardly from the opposite side of said frame and adapted for engagement with the surface of a windshield for maintaining said closure spaced therefrom; a pair of lugs projecting outwardly from opposite edges of said frame; and a locking finger slidable on each of said lugs and engageable with a windshield frame for retaining said first mentioned frame in position thereon.

4. A device of the class described, comprising: a frame; a transparent closure mounted in said frame, at one side thereof; a strip of yieldable material projecting outwardly from the opposite side of said frame and adapted for engagement with the surface of a wind-shield for maintaining said closure spaced therefrom; a pair of lugs projecting outwardly from opposite edges of said frame; a plurality of locking fingers, each having an elongated slot intermediate its ends; securing means in each of said lugs projecting through a slot in one of said fingers for slidably mounting the finger on the lug, there being a pair of said fingers at opposite sides of the frame, the fingers at each side projecting outwardly in opposite directions for engaging a windshield frame and securing said first mentioned frame thereon.

In testimony whereof I have signed the foregoing specification.

LOUIS RIBAR.